July 19, 1938. W. F. POGUE 2,124,120
HEATING STOVE
Filed Jan. 14, 1936 2 Sheets-Sheet 2
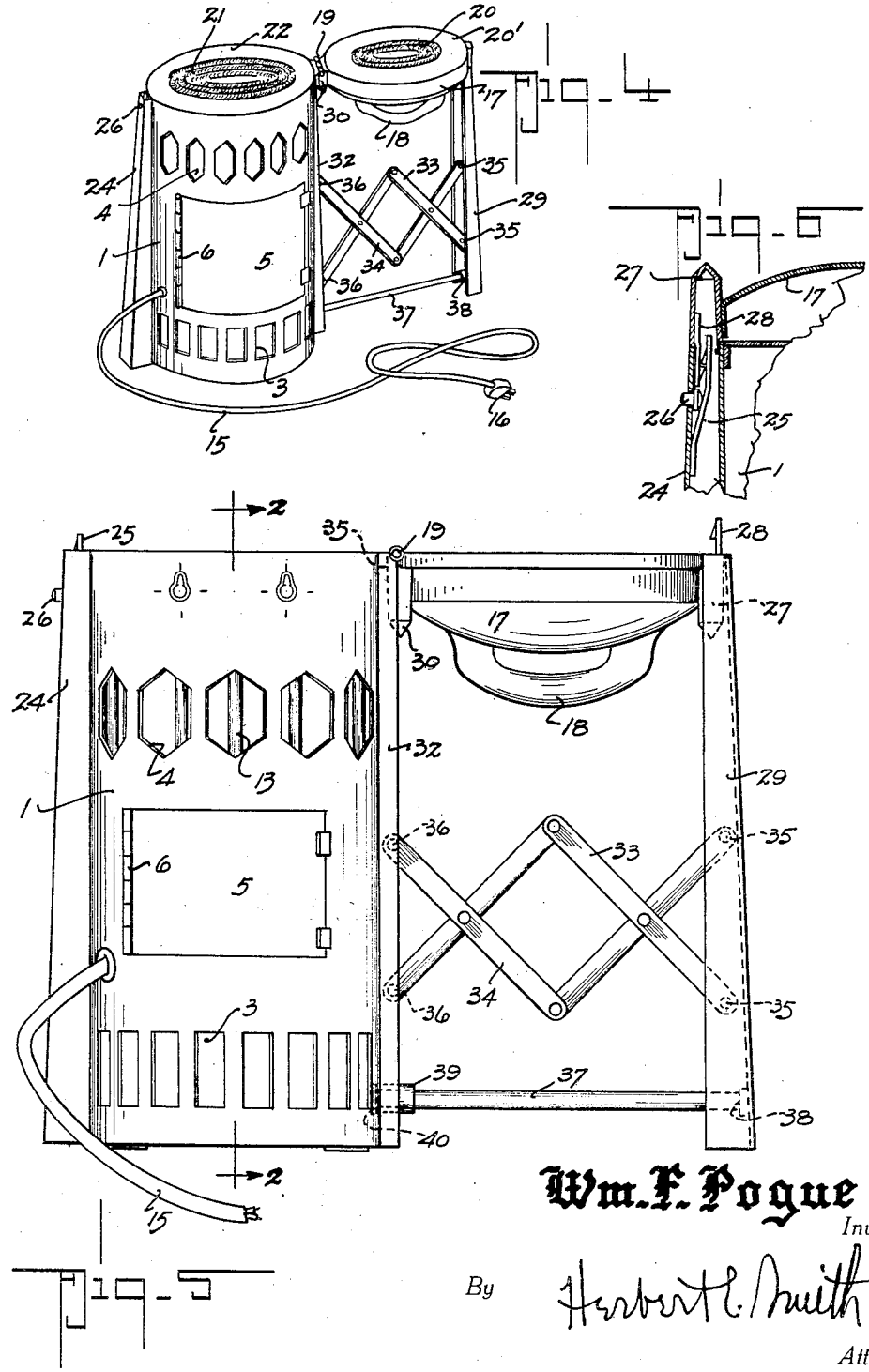
Wm. F. Pogue
Inventor
By Herbert E. Smith
Attorney Patented July 19, 1938

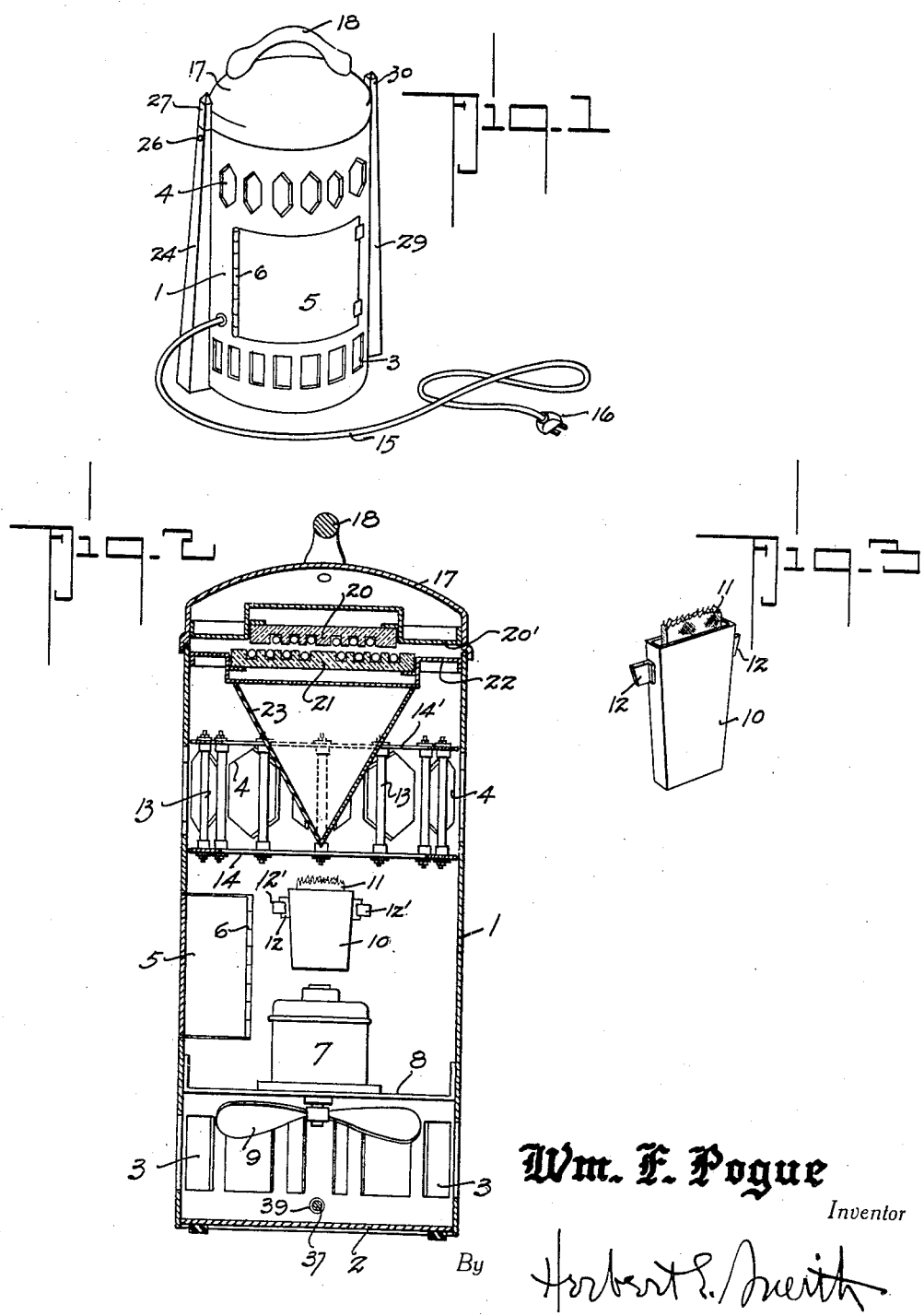

2,124,120

UNITED STATES PATENT OFFICE 2,124,120

HEATING STOVE

William F. Pogue, Spokane, Wash.

Application January 14, 1936, Serial No. 59,105

3 Claims. (Cl. 219—19)

My present invention relates to improvements in heating stoves of the portable, hot air type, for domestic and other uses, and employing one or more electrical heating units for the source of heat. In carrying out my invention I utilize a convertible stove adapted for either, or both, heating and cooking purposes, and the stove is constructed in such manner that it may readily be converted for such uses.

The stove embodies a compact and novel combination and arrangement of parts by means of which air in a room may be heated, moistened, and caused to circulate throughout the room or compartment to be heated; and when the stove is converted for cooking purposes, the appliance is conveniently accessible for use, stable in its position or location, and reliable in the performance of its functions.

Because of its compact arrangement of parts for heating and for cooking purposes, the appliance occupies a comparatively small space; and it also presents a neat and ornamental appearance in addition to its efficiency in the performance of its required functions.

The invention consists in certain novel combinations and arrangements of parts as will hereinafter be more fully set forth and claimed. In the accompanying drawings I have illustrated one complete example of the physical embodiment of my invention in which the parts are combined and arranged in accord with one mode I have devised for the practical application of the principles of my invention, but it will be understood that changes and alterations may be made in the exemplifying structures of the drawings, within the scope of my claims, without departing from the principles of my invention.

Figure 1 is a perspective view of the stove when it is employed solely for heating purposes.

Figure 2 is an enlarged vertical sectional view of the stove of Figure 1.

Figure 3 is a perspective view of the air moistener, detached from the interior of the stove.

Figure 4 is a perspective view showing the convertible appliance extended for use as a cooking stove, or for both heating and cooking purposes.

Figure 5 is an enlarged side elevation of the appliance as seen in Figure 4.

Figure 6 is a detail sectional view showing the latch connection between the hinged lid or cover and the drum or casing of the stove.

As a preferred form of the invention I have shown the casing or drum 1 of cylindrical shape, and other parts of the appliance conform thereto, but it will be understood that other shapes may be adopted for the drum or casing, as well as for other parts of the appliance. The casing, which is shown fashioned from sheet metal, is provided with a closed base 2 which may be slightly elevated from the floor, and either fastened to the floor or if preferred, the base may be loose from the floor to permit moving of the appliance. In the base portion of the drum, near the floor a series of air inlet ports 3 is arranged, these ports being arranged in an annular series in order that air to be heated may enter the interior of the cylindrical casing from all directions. At a considerably spaced distance above the annular series of air inlet ports I provide the casing with another annular series of ports 4 for outlet and distribution of the heated air which is impelled from the interior of the casing.

A door 5 is hinged at 6 to the casing so that access may readily be had to the interior of the casing when necessary or desirable.

Just above the air inlet ports an electric motor 7 is mounted centrally of the interior of the casing and supported on a spider frame 8 secured to the casing of the stove. An impeller or fan blower 9 is mounted on the motor shaft below the motor and in proper relation to the inlet ports in order that the fan may impel air currents upwardly through the casing to be heated. It will be understood that the rotation of the fan blades induces drafts or currents of air to pass from the floor portion of the room through the air inlet ports, and the fan impels the air to rise in currents through the casing.

For properly conditioning or humidifying the air currents ascending through the casing I employ an air moistener of suitable type, located just above the motor, from which the moisture is evaporated by the passing currents. The air moistener comprises a water-container 10 of suitable capacity and shape, having a capillary wick 11, and provided with attaching flanges 12 by means of which the device is supported on bars 12' fixed to the casing 1. The air moistener is readily detachable, and access may readily be had thereto through the open door 5, for replacement of water in the container, adjustment of the wick, and for other purposes.

The humidified air is heated, prior to passing out through the outlet ports, by means of a number of electrical heating units 13, which are suitably supported on the two spider frames 14 and 14' attached in suitable manner to the inner face of the cylindrical casing. These heating units, and the other electrical heating units, are supplied with electric current through the cable 15 having appropriate connections with the units, and the cable may be "plugged in" to a suitable outlet box, or wall fixture, by means of the attaching plug or connection 16, shown in Figures 1 and 4.

On the top of the stove casing is mounted a dome-shaped foldable, lid or cover 17, having a handle 18 by means of which it may be lifted or swung on its hinges 19 that connect the lid with the cylindrical casing. The inner face of this dome shaped lid or cover is provided with a heating unit 20, and the closed head of the cylindrical casing is also provided with a heating unit 21, both of which are specially adapted for cooking purposes, although, in some instances, these heating units may be employed for warming the atmosphere adjacent thereto.

The heating unit 20 is mounted in a face plate 20' and the heating unit 21 is mounted in an annular plate or ring 22 which forms the flat top of the cylindrical casing and of the air-heating chamber within the casing. For cooking purposes, the hinged lid is swung up and over on its hinges to horizontal position, as in Figure 4 and 5, thereby exposing both heaters 20 and 21 for use, and the parts 20' and 22 provide supports for the cooking utensils.

Within the cylindrical casing, and beneath the stationary electric heating unit 21, is located a deflector 23, in the form of an inverted cone or conical head, which projects downwardly and centrally of the upper portion of the air chamber into the midst of the electrical heating units 13. These units are arranged in an annular series around the deflector, and the deflector serves to spread the ascending air currents outwardly from the central part of the casing toward the heating units, thereby insuring that all of the air currents will be heated and passed to the outlet ports for the heated air.

The heating unit 21, which is stationary and designed to be used specially for cooking is properly supported at all times in the closed upper head of the casing. The foldable, hinged unit 20, also designed especially for cooking purposes, is supported and braced when in position for cooking, to provide a stable and reliable cooking device.

For retaining the hinged lid in closed position, I utilize a latch device between the upper end of an ornamental, lateral, housing 24 and the lid. Within the upper open end of the housing a spring latch 25 is mounted and a button 26 projects through the wall of the housing to be depressed, or pushed in, to release the latch. As best seen in Figure 6, the lid is fashioned with an upright cap 27 which alines with and forms an extension of the housing 24 when the lid is closed. Another, oppositely arranged spring latch 28 is mounted in this cap for co-action with the latch 25 of the housing, and by pressure on the button this latch device is released to permit the outward unfolding movement of the hinged lid.

On the exterior of the casing, diametrically opposite the ornamental housing 24, another upright housing 29 is mounted for utilitarian purposes, and this housing 29, which terminates at the top of the casing is given an extended appearance when the lid is closed, by the use of a cap 30 fixed on the exterior of the lid or cover, at the hinge joint 19, as indicated in Figure 1. When the lid is unfolded or opened on its hinge, the cap 30 swings into a recess at the top of an upright brace 32, which brace is enclosed by the housing 29, when the heaters 20 and 21 are not in use.

The housing 29 forms a laterally movable leg which may be projected, as in Figure 5, from the casing, with its upper end in position to receive the cap 27 of the hinged cover. In this manner the hinged lid with its heater 20 is supported on the hinge joint and by the two caps 27 and 30 in engagement with the leg 29 and the upright, fixed brace 32, respectively.

The laterally movable leg 29 is connected with the upright fixed brace 32 by means of an extension frame or lazy tongs comprising pivoted links 33 and 34 which are hinged at 35 and 36 respectively to the movable leg and the fixed brace.

For rigidly holding the heater unit and its frame in extended position, and for guiding the movement of the movable leg, I employ a slidable brace rod 37, which is fixed at 38 near the foot of the leg, and which slides in a bearing sleeve 39 fixed in the brace 32 and opening through the wall of the casing. As the leg is pulled away from the casing, the rod 37 slides in the bearing sleeve, and a flanged head 40 on the rod limits the outward sliding movement of the rod and of the heater-supporting frame.

After the extensible frame has been projected into operating position, the hinged lid or cover with its heater, is swung up and over, and then down to horizontal position with the two caps 27 and 30 guiding and supporting the lid and heater into position for use of the heater.

When restoring the cooking parts to inactive position, the lid is first swung on its hinged joint, over the top of the casing and latched, and then, by a push against the upright leg 29 the lazy tongs are folded into the housing 29, and the brace rod 37 is slid into the interior of the casing, whereupon the appliance presents the appearance illustrated in Figure 1.

Having thus fully described my invention, what I claim as new and desire to secure by Letters Patent is:—

1. The combination with a stove having a fixed heating unit, of a hinged cover therefor having a heating unit adapted for separate and/or joint use with the fixed heating unit when the hinged cover is swung open, a laterally movable leg mounted on the exterior of the stove and an exterior recessed portion on the stove, and diametrically arranged caps on said cover adapted to engage the movable leg and said recessed portion for retaining the cover and its heating unit in active position.

2. The combination with a stove having a fixed heating unit, of a hinged cover therefor having a heating unit adapted for separate and/or joint use with the fixed heating unit when the hinged cover is swung open, a laterally movable housing forming a leg, an upright brace fixed on the stove and adapted to be enclosed by the housing, a lazy tongs connecting said brace and housing, a slide rod fixed on the leg and slidable in the stove, and diametrically arranged caps on said cover adapted to engage the upper end of the leg and said upright brace for retaining the cover and its heating unit in active position.

3. The combination with a stove having a fixed heating unit, of a hinged cover therefor having a heating unit adapted for separate and/or joint use with the heating unit, a laterally movable support mounted on the exterior of the stove, interconnected co-acting means intermediate of the stove and support, said interconnected co-acting means adapted to be extended to active position, for partially supporting the hinged cover, and co-acting means on the stove, cover, and support for retaining the hinged cover and its heating unit in active position.

WILLIAM F. POGUE.